June 23, 1931. T. M. BRUBACK ET AL 1,811,491
PLANETARY PIPE THREADING TOOL
Filed July 3, 1928 4 Sheets-Sheet 3

INVENTOR
Theodore M. Bruback.
and De Los E. Hibner Jr.,
By Attorneys,
Fraser, Myers & Manley INVENTORS:
Theodore M. Bruback
and De Los E. Hibner Jr.
By Attorneys,
Fraser, Myers & Manley Patented June 23, 1931

1,811,491

UNITED STATES PATENT OFFICE

THEODORE M. BRUBACK AND DE LOS E. HIBNER, JR., OF DU BOIS, PENNSYLVANIA

PLANETARY PIPE-THREADING TOOL

Application filed July 3, 1928. Serial No. 290,176.

This invention relates to portable tools or apparatus for threading pipes, wherein the thread is cut by a milling cutter or hob which while revolving travels in planetary fashion around the end of the pipe being threaded. Heavy stationary machines for threading pipe in this manner have long been in satisfactory use. The present invention provides a convenient portable tool for threading pipe which may be readily carried to the job where the pipe fitting is to be done, and which can be operated by manpower to readily and rapidly cut the necessary screw-threads on pipes of varying sizes.

A device constituting the best known embodiment of the invention is illustrated in the accompanying drawings, wherein.

Figures 4, 4A, 5:
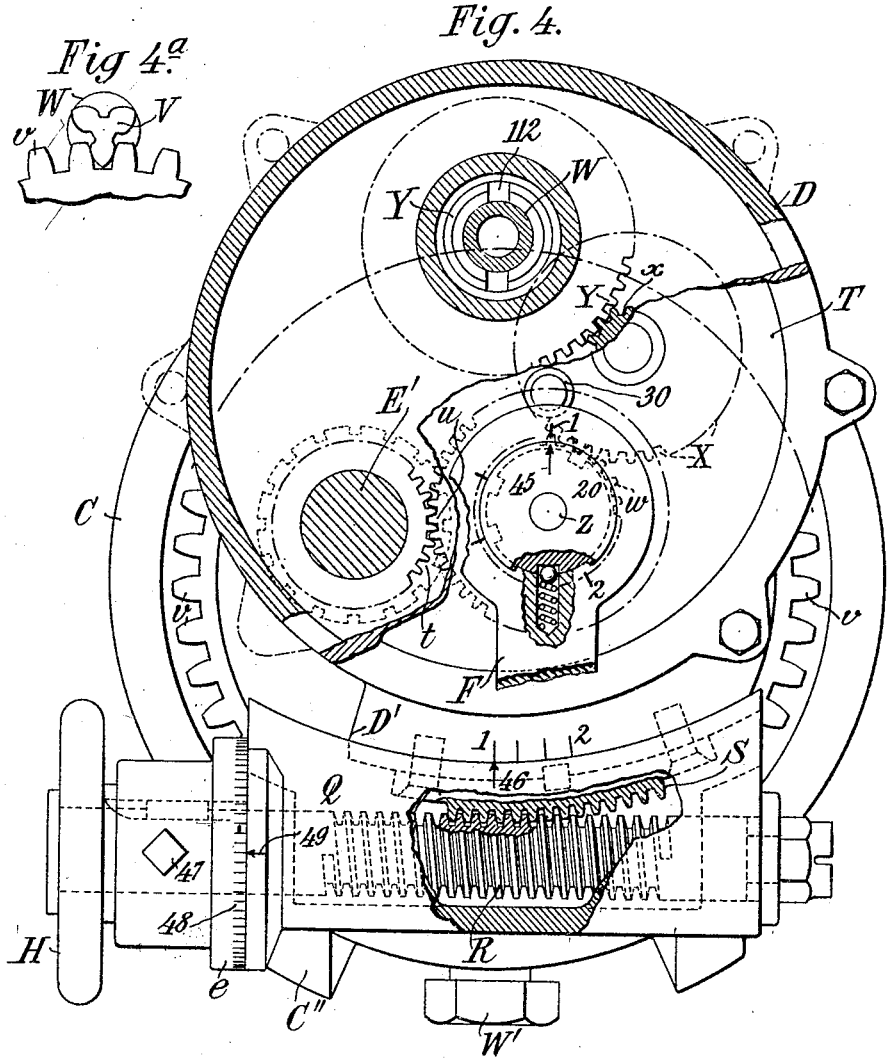
Fig. 4 is a vertical transverse section in the plane of the line 4—4 in Fig. 2, and looking toward the left in that figure, the hob being here shown in similar position to that in Fig. 1.

Fig. 4ª is a fragmentary view showing the engagement of the planetary feed gears.

Fig. 5 is a fragmentary view showing the relations of the pipe, its end gauge, and the cutter.

Figure 2:
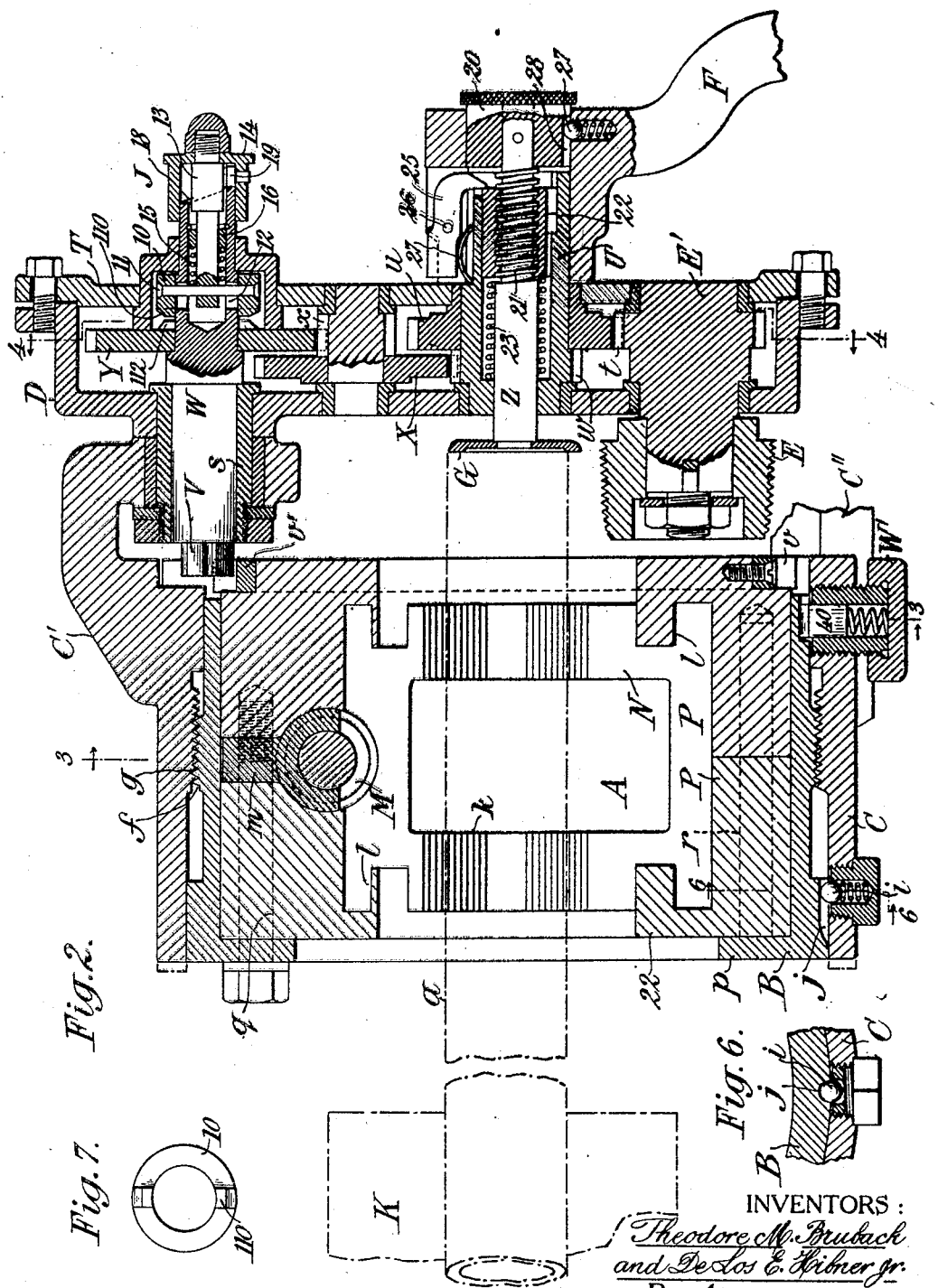
Fig. 2 is a vertical mid-section in the plane of the axis of the pipe being threaded, the milling tool or hob being here shown in a different position from that in Fig. 1.

Fig. 6 is a fragmentary transverse section on the line 6—6 in Fig. 2.

Fig. 7 is a detached view of the coupling ring 10.

The improved threading tool comprises a chuck or vise A for clamping it fast upon the pipe $a$ to be threaded; a stationary casing B which is held fixedly in position on the pipe by means of its enclosed chuck A; a revolving outer shell C which is mounted to turn about the casing B while moving longitudinally thereon at a rate corresponding to the pitch of the thread to be cut; a swinging frame or casing D hung eccentrically upon the shell C and carrying the revolving milling cutter or chaser E, which in this art is colloquially termed the "hob"; and a crank F to be turned by the operator; with suitable interposed gearing and other operating means as will be described. Among these is a gauge G for correctly locating the end of the pipe to be threaded; an adjusting handle H whereby to feed up the hob to cause it to cut the thread to the required depth; and a clutch J for throwing the planetary feed into or out of action. The description will be more clear if the mode of operation is described before entering into the details of construction.

Figure 3:
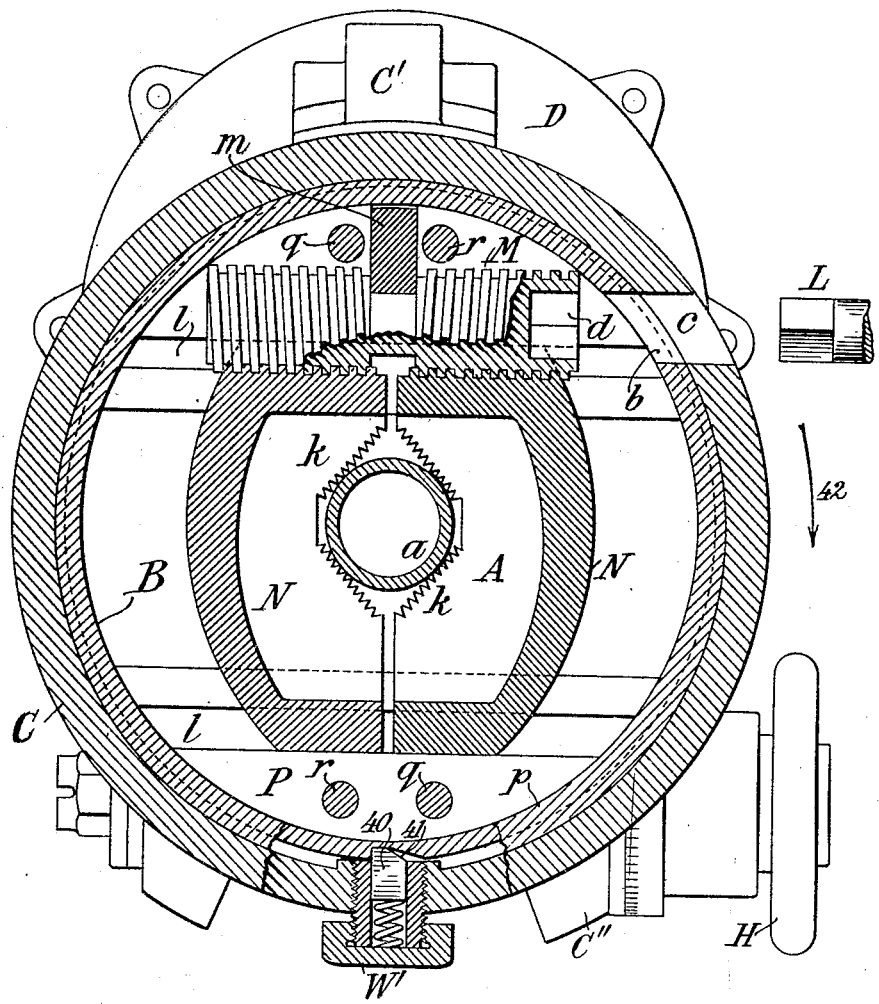
Fig. 3 is a vertical transverse section in the plane of the line 3—3 in Fig. 2.

Assuming that the pipe $a$ to be threaded is held in a vise K shown in dotted lines in Fig. 2 (or held fast in any other manner), the tool is slipped over the end of the pipe to be threaded until the end of the pipe abuts against the gauge G (which will previously have been correctly set according to the threading requirements for such pipe); a suitable chuck-operating key, having in this instance a square end, as shown at L in Fig. 3, will then be inserted through two coinciding holes $c$ in the outer shell C and $b$ in the inner shell B, and entered into a square socket $d$ in a chuck-operating screw M, and this screw turned to draw together the two jaws of the chuck A to cause them to grip the pipe, thereby locking the tool as a whole fast to the pipe. At this time the clutch J controlling the feed is disengaged. The operator will then turn the adjusting handle H, whereby to feed the hob E toward the pipe, and at or before contact of the cutter teeth of the hob with the pipe he will begin to turn the crank F, whereby through gearing the hob is rotated in such direction as to make a milling cut into the pipe as the feeding handle H is further turned; by means of this handle the hob will be fed up until it cuts into the pipe the depth of the required thread; in this the operator is guided by graduations on a connected collar $e$. Near the beginning of the crank movement the gauge G is automatically retracted to bring it out of the way of the subsequent feed. Then to cause the cutter to travel in its planetary orbit around the pipe, the operator will manipulate the feed clutch J to start the feed mechanism in operation and thereby cause the outer shell C to be slowly rotated around the inner shell B, and consequently around the pipe; and as this shell carries the swing frame or casing D which carries the hob, the latter will travel around the pipe, its teeth cutting the thread as it progresses. In order that the teeth shall cut a thread having a spiral pitch, the outer shell C is caused to move axially along the pipe, which is conveniently accomplished by threading the outer shell C around the inner shell B. For this purpose the inner shell is provided with screw-threads $f$, and the outer shell with screw-threads $g$, as shown in Fig. 2. By reason of these threads the hob, while rotating on its own axis and executing its planetary movement around the pipe, also progresses in a helical path having the pitch of the threads to be cut, so that when it has completed its orbital movement it has advanced a distance equal to the pitch of the thread. When this full planetary revolution of the hob has been completed, the operator will receive a signal indicating this fact, which may conveniently be brought about by a spring-pressed ball $i$ snapping into a groove or notch $j$ (or by any equivalent snapping action), whereby to cause an audible click which is the signal to the operator that the work is completed.

The operator will then turn back the handle H to retract the hob E from the work; and will then manipulate the feed control J (as hereinafter described) so as to render the feed inoperative and thereby free the outer shell C; after which he will turn the outer shell C back for one revolution to its starting position, the end of which movement is again indicated to the operator by the clicking of the ball $i$ into the notch $j$. Preferably, however, a latch W' is provided (to be described later), the bolt 40 of which, at the end of the return movement, having entered a notch 41 (Fig. 3), abuts against the abrupt side of this notch and thereby positively stops the return rotation. This backward movement occurs without other resistance than the slight friction of the shell C turning on the body B, and the rotation of shaft W by gear $v$ and pinion V; because during this movement the hob is doing no work, since it has been withdrawn from contact with the pipe and need not even be in rotation, since it is needless during this backward movement to turn the crank F. The tool is then taken off the pipe by inserting the key L through the holes $c$, $b$ (which come into coincidence when the ball $i$ enters its notch), and by turning the key the chuck jaws A are separated, whereby to disengage the tool, which is then slipped off from the pipe.

It will be understood that the milling cutter or hob is, as usual in threading machines of the milling type, formed with parallel ribs, as distinguished from being spirally threaded, the cutting of a spiral thread on the pipe being accomplished by the movement in axial direction of the outer shell C as controlled by the engaging screw-threads $f$, $g$.

Figure 1:
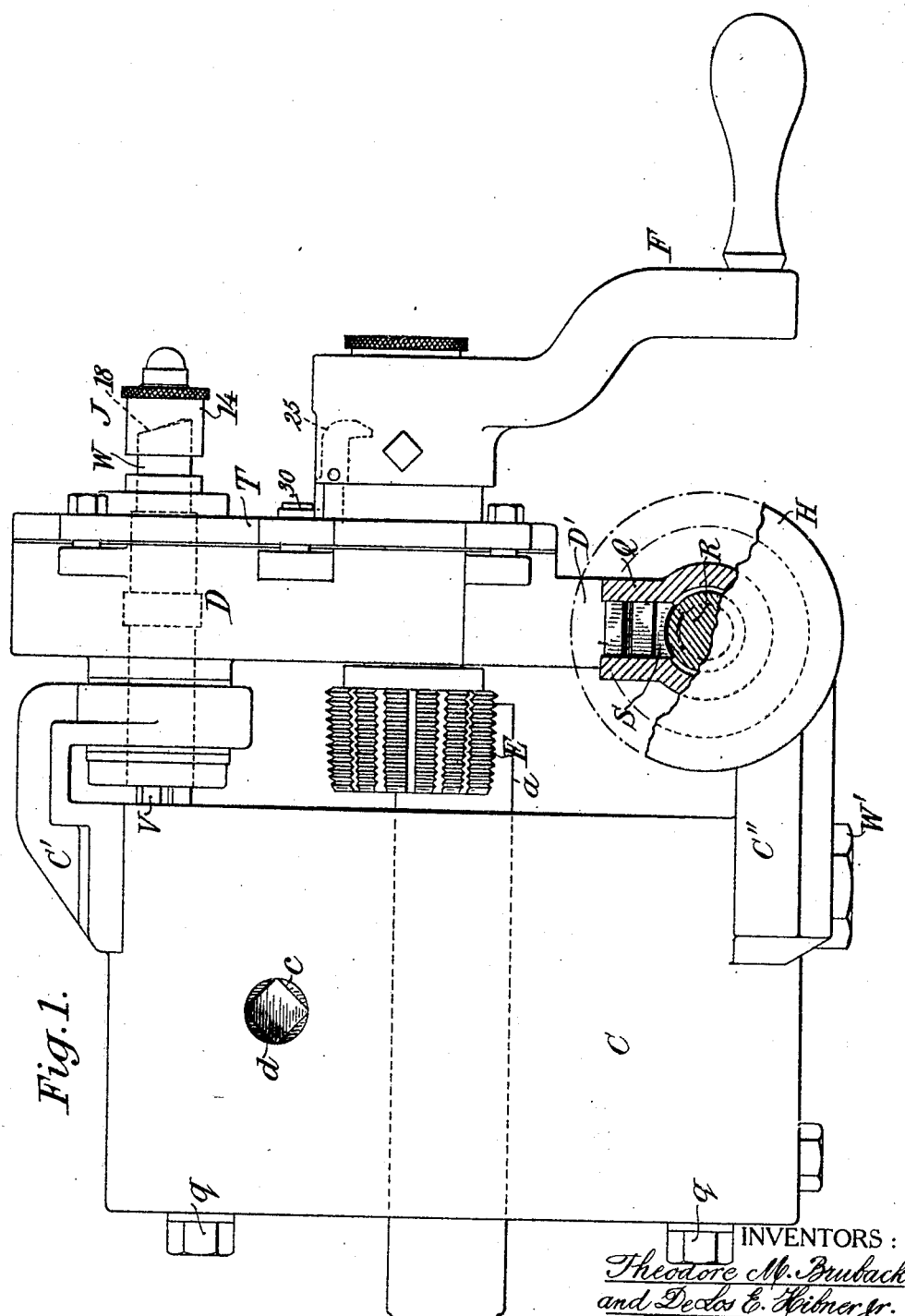
Figure 1 is a side elevation partly broken away in vertical section.

The preferred details of construction will now be described. The chuck A is most desirably made with two pairs of jaws $k$, $k$, serrated to engage the pipe and formed on sliding chuck members N, N, mounted to slide in grooves or slideways $l$ in the inner shell B. The chuck screw M is a right and left threaded screw, its threads engaging partial threads in the chuck members N, N, as shown in Fig. 3, and the screw being held against displacement along its axis by means of a fixed key $m$ engaging a neck formed at the middle of the screw. For assembling the parts the inner shell B is made with an inner body portion P, P, and an outer barrel-formed shell $p$; the inner body is divided so that that parts P, P, meet in the plane indicated by the line 3—3 in Fig. 2, so that in assembling these parts the clutch jaw slides N, N, and the screw M and key $m$, are engaged between the two body parts or members P, P. These are then fastened together and to the outer shell $p$ by means of any suitable bolts or screws such as two diametrically-opposite screws $q$ $q$ (Fig. 3), the heads of which are shown at the left in Fig. 1. For correctly locating the members P, P, in assembling the inner parts, it is desirable to provide two pins $r$ $r$ which may be made a driving fit with one of the parts $p$, and a working fit with the other.

The outer shell or casing C is formed at one side (here shown as at the top) with a bracket arm C' which my conveniently be formed integrally with it, and which is bored to receive a bushing $s$ which projects beyond it and forms a hollow stud on which is pivoted the swing frame or casing D carrying the thread cutter or hob E. The casing C also has on the side opposite the bracket arm C', a projection C'' (or preferably a pair of projections) carrying a guide Q fixedly united through the arm or arms C'' to the casing C. The swing frame D has its lower portion D' formed to project into a slot in the upper side of the guide Q, whereby to steady the frame in its swinging movement. The abutting faces of the lower part of the projection D' and of the upper part of the guide Q, are preferably made in an arc struck from the axis of the bushing $s$, so that as the swing frame moves around this axis, its lower part is guided in both directions by its engagement with the guide Q.

The guide Q is formed also with a barrel portion which encloses a screw or worm R which passes out through at least one end of the guide Q and has keyed at its projecting end the adjustable handle H which is here shown as a knob.

The swing frame D has at its lower arc-shaped extension D' a segmental gear or rack S fastened to it, its teeth meshing as a wormwheel with the teeth of the worm R. Thus by turning the handle H the worm imparts to this swing frame its swinging movement, whereby to bring the hob E which is carried by this frame, toward or from the center of the pipe to be threaded.

The swing frame D is made hollow and constitutes a gear case having a cover T for closing it on its outer side. This gear case encloses and forms bearings for the several gears and the spindle of the hob E and that of the crank F. The hob is shown as fastened with a keyed connection upon a spindle E' (see Figs. 2 and 4), the spindle being formed with pinion teeth $t$ engaged by the teeth on gear $u$ which is made fast to a spindle U on which is fastened the hub of the crank F. Thus, as the crank is turned, the hob E is rotated to make its cut.

The feed for causing the planetary travel of the hob while cutting is accomplished by the engagement of a pinion V (which is slowly rotated from the crank) with gear teeth $v$ formed on the inner casing B. The pinion and gear teeth are best shown in Fig. 4$^a$. The gear teeth may conveniently be formed on a ring $v'$ seated in a concentric neck formed on one of the body members P and fastened thereto by screws, as shown in Fig. 2. To allow for the spiral travel of the outer shell C during the planetary movement, the pinion V at starting engages with only a portion of the width of the face of the gear teeth, as shown in Fig. 2, the overlap of the respective teeth gradually increasing during the planetary revolution.

The pinion V is conveniently formed on the end of a spindle W (Fig. 2) which is rotated through a train of gearing from the crank F. The crank spindle U is formed with pinion teeth $w$ which drive a gear X having on its spindle pinion teeth $x$ which mesh with and drive a gear Y which turns loosely on the spindle W, but may be clutched thereto by clutch members under control of the clutch-operating part J. The clutch is shown in Fig. 2 as disconnected, so that the gear wheel Y turns idly and no feed motion is imparted. To start the feed the operating part J is manipulated to engage the clutch and thereby lock the gear Y to the spindle W, so that upon the turning of the crank the pinion is driven, at a reduced rate of speed such as to impart the proper rate of planetary advance to the hob, while its cutting teeth are cutting into the pipe.

The clutch device operated by the controlling handle J may be variously constructed. The construction shown comprises a sliding ring or sleeve 10 having non-rotative engagement with the spindle W, and having on its side toward the gear Y, teeth 110 which, as it is moved toward the gear, interlock with teeth 112 on the hub of the gear. A convenient construction is that shown, wherein the sliding ring 10 has a pin 11 passing diametrically through the spindle W which is made hollow, and engaging longitudinal slots 12 in the spindle, and itself engaged at its middle by a stem 13 the outer end of which is locked to an outer operating knob 14 by which endwise movement may be imparted to engage or disengage the clutch members. A spring 15 tends to engage the clutch members and reacts against a ring or bushing 16 fastened within the hollow spindle. The end of the spindle is given an oblique cut, as shown at 18, and this oblique end engages with an inner projection 19 within the operating knob 14, so that as the latter is turned, this projection will ride along the inclined end of the spindle, thereby resolving the turning movement of the knob into a longitudinal movement of the stem 13. The stress of the spring 15 is resisted by engagement of the projection 19 with the incline 18 to hold the clutch disengaged, as shown; or upon a half turn of the knob the riding of the projection down the incline enables the spring to throw the clutch into engagement. Thus, by a half turn of the knob 14 the operator is able to clutch in or out the feed movement.

The gauge G requires to be adjusted before the beginning of the operation to adapt it to the required length of the pipe end to be threaded, this adjustment depending upon the size of the pipe. The gauge is a disk mounted on one end of the spindle Z which has fastened on its other end an adjusting knob 20, and between is formed with a screw-thread 21 engaging an internal thread in a bushing 22 which is slidable within the hollow spindle U, but is keyed thereto so as to necessarily rotate therewith. A spring 23 presses to the right against this bushing and tends to pull back the gauge G from its set gauging position, which it occupies in the starting position of the tool, while latch 40 is engaging its notch 41. The bushing is held in this position at starting by means of a catch 25 consisting of a lever pivoted at 26 to the crank hub, this lever having its nose curved inwardly to abut against the outer end of the bushing 22, and having a spring 27 pressing against its opposite arm to hold it in such engagement. While thus engaged, the bushing 22 maintains a fixed position, so that by turning the knob 20 to rotate the spindle Z, the screw-threads 21 turn within the fixed bushing 22 in order to screw the spindle in or out and thereby bring the gauge G to its desired initial gauging position. During such adjustment the parts are held in place by the spring catch 25. This adjustment is necessarily made while the tool is in its initial or starting position, and is made before applying the tool to the pipe to be threaded. After the tool is applied and locked fast, it is desirable then to move the gauge G back so that it will not interfere with the feed of the tool onto the pipe during the planetary movement; this is accomplished by withdrawing the catch lever 25 at any time after the chuck is engaged with the pipe. For this purpose a roller 30 (Figs. 1 and 4) is mounted on the cover T in such position that upon the rotation of the crank its first turn will bring the tail of the catch lever 25 into engagement with this roller, which latter approaches near enough to the crank center to tilt the catch lever 25 and withdraw its nose from the outer end of the bushing 22, whereupon the spring 23 throws back the gauge G.

Fig. 5 shows the relative arrangements of the pipe $a$, the cutter or hob E at one part of its travel, and the gauge G and crank spindle U. The center of the hob travels around the pipe in an orbit indicated by the dotted circle $z$.

An auxiliary snap catch W′ is provided, consisting of a shell in which is enclosed a spring-pressed latch 40 having a beveled end engaging in a tooth 41 (Fig. 3) which is abrupt on one side and beveled on the other. The purpose of this is to hold the outer casing stationary during the preliminary feed by the handle H, and while the hob is cutting its way to the depth of the thread at its initial cutting position. During this initial cut the reaction of the cutting teeth of the hob against the metal of the pipe tends to rotate the outer shell C in the direction of the arrow 42 in Fig. 3, and this is prevented by the catch 40 bearing against the abrupt side of the notch 41. When, however, the hob has been entered to the required depth and the planetary feed is started, this causes the outer shell C to travel around the stationary inner shell in the direction of arrow 43, at the starting of which movement the catch 40 rides up the inclined side of the notch and thereafter bears against the concentric outer portion of the inner shell B. On completing the revolution the latch 40 would drop over the abrupt side of the notch 41 and would obstruct the idle return movement of the tool to its initial position, but that this occurrence is avoided by making the notch 41 so short axially (as shown in Fig. 2) that the endwise movement of the shell C during its rotation (being for a distance equal to the pitch of the threads $f$, $g$, as shown by dotted lines at the left in Fig. 2) carries the catch 40 beyond the end of the notch, so that at the end of the rotation the latch is upheld by the concentric outer face of the body B and cannot enter the notch.

The particular machine here shown is designed to thread pipes ranging between one and two inches in diameter, these sizes requiring a standard thread of a pitch of 11½ threads to the inch. For that purpose the threads $f$, $g$, are given that same pitch. To assist the operator and hasten the operation in making the necessary adjustments for different sizes of pipe, certain gauging marks or graduations are provided. The gauge-adjusting knob 20 has a pointer 45 (Fig. 4) which may register with graduations 1 (for a one-inch pipe) or 2 (for a two-inch pipe), or with any other desired intermediate graduations, which, for example, may be for 1¼ and 1½ inch pipes. Similarly, the guide Q is desirably provided with a pointer 46 which may register with several graduations on the swing frame extension D′, according to the size of pipe to be threaded, the graduation 1 being for a one-inch pipe, 2 for a two-inch pipe, and the intermediate marks for suitable intermediate sizes of pipes. Also, the collar $e$, which is fastened by a set-screw 47 to the spindle forming the worm R, is provided with graduations 48 which may register with a stationary pointer 49 on the guide Q and may be suitably numbered to guide the operator as to how far he should turn the knob H in order to feed the hob the proper depth into its cut. In setting the tool for use with a given size of pipe, the knob 20 is turned to bring it to the proper angular position, as indicated by the graduations, and is then forcibly pushed in to compress the spring 23 and permit the catch 25 to snap in behind the bushing 22 to hold the gauge in its initially-projected gauging position. This will normally be done with the crank F down, and the angular relation of the catch 25 and releasing roller 30 is such that in this position the engagement of the catch is not interfered with by the roller.

The adjusting handle or knob H is in such position that it may be conveniently turned with the left hand while the operator with the right hand is rotating the crank.

The gearing may be variously proportioned. In the construction shown, the hob turns at an angular speed somewhat exceeding that of the crank,—perhaps 1½ to 1. The feed train may be so proportioned as to cause the complete planetary revolution of the hob in about 91 turns of the crank.

While the new portable tool provided by this invention is designed to be manually operated by means of a crank, yet it is to be understood that the crank may be replaced by any equivalent driving means, such, for example, as a portable electric motor.

We claim as our invention:

1. A portable planetary pipe-threading tool comprising a stationary body and means for locking it on the pipe, a casing rotative around and receiving said body, a rotary multiple thread cutter, a mounting for said cutter movable with respect to said casing for feeding the cutter toward the pipe axis, a crank for rotating said cutter, gearing driven by said crank for rotating said casing around the body to advance the cutter in a planetary course around the pipe, and means for limiting such planetary movement to one revolution.

2. A pipe-threading tool comprising a stationary body and means for locking it on the pipe, a casing rotative around said body, a swing frame outside said casing beyond the end of the pipe to be threaded, said swing frame carried by said casing on a pivotal bearing eccentric to the pipe axis, a rotary thread cutter carried by said swing frame, a crank for rotating the cutter, gearing driven by said crank for rotating the casing for advancing the cutter in a planetary course around the pipe, and means for moving said swing frame for feeding the cutter toward the pipe axis.

3. A pipe-threading tool comprising a stationary body and means for locking it on the pipe, a casing rotative around said body, a swing frame carried by said casing, a rotary thread cutter carried by said swing frame, a crank for rotating the cutter, gearing driven by said crank for rotating the casing for advancing the cutter in a planetary course around the pipe, comprising a feed spindle having an axis coincident with the axis around which the swing frame turns, and means for moving said swing frame for feeding the cutter toward the pipe axis.

4. A pipe-threading tool comprising a stationary body and means for locking it on the pipe, a casing rotative around said body, a swing frame carried by said casing and formed as a hollow shell constituting a gear chamber, a rotary thread cutter carried by said swing frame, a crank for rotating the cutter, turning in bearings in said swing frame and having a geared connection with the cutter, gearing driven by said crank for rotating the casing for advancing the cutter in a planetary course around the pipe, said gearing enclosed within the hollow chamber of the swing frame, and means for moving said swing frame for feeding the cutter toward the pipe axis.

5. A pipe-threading tool according to claim 1, said disconnecting means comprising a clutch the members of which are connected respectively with the crank-driven gearing and with the planetary feed, and a handle for throwing said clutch in or out.

6. A pipe-threading tool comprising a stationary body and means for locking it fast, a rotary casing having screw-threaded engagement with said body, a rotary thread cutter carried by said casing, with means for adjusting it toward the pipe axis, a crank for rotating said cutter, a planetary feed mechanism for advancing the cutter around the pipe, and an interengaging catch and recess on the casing and body respectively, located to engage in the starting position and to re-engage upon completion of one revolution of the casing to indicate to the operator that the cutter has completed its work.

7. A pipe-threading tool comprising a stationary body, a casing rotative around it, a rotary cutter carried by the casing, a crank for rotating said cutter, a planetary feed mechanism comprising gearing terminating in a pinion having bearings carried by the casing and a gear fixed to said body and engaged by said pinion to rotate the casing around the body, and a swing-frame carrying the bearings for said cutter, crank, and gearing, and mounted to swing about an axis coincident with the axis of said pinion.

8. A pipe-threading tool comprising a stationary body and means for locking it fast, a casing rotative around said body, an eccentric pivotal bearing carried by said casing, an arc-shaped guide carried by said casing, a swing-frame pivoted to the casing on said eccentric bearing, and having an arc-shaped portion engaging said guide, a rotary cutter and a crank for rotating it carried by said swing-frame, and adjusting means carried by the casing and swing-frame for swinging the latter to feed the cutter to its work.

9. A pipe-threading tool according to claim 8, the said adjusting means comprising a worm and handle for turning it, carried by the casing, and a toothed sector engaging said worm, carried by the swing-frame.

10. A pipe-threading tool comprising a stationary body and means for locking it fast, a casing rotative around said body, a rotary thread cutter in bearings carried by said casing, a crank for rotating said cutter, means for adjusting said cutter toward the axis of the pipe, and means applied to the casing and body respectively for preventing planetary motion of the cutter while it is being preliminarily fed to its work.

11. A pipe-threading tool according to claim 10, said last-named means comprising a catch on one part engaging a notch in the other, said part having abrupt engagement in one direction to prevent said planetary movement, and beveled engagement in the opposite direction to permit planetary movement during the subsequent planetary travel of the cutter.

12. A pipe-threading tool comprising a stationary body, means for clamping it on the pipe, a casing rotative around said body, a planetary thread cutter rotative in bearings carried by said casing, a crank for rotating said cutter, a gauge for locating the tool body with reference to the end of the pipe to be threaded, and means for automatically withdrawing said gauge near the beginning of the threading operation, with means for automatically withdrawing said gauge near the beginning of the threading operation, said means comprising a retracting spring for the gauge, a catch for holding the gauge projected, and means connected with the crank for releasing said catch.

13. A portable pipe-threading tool comprising a hollow cylindrical stationary body, a casing rotative around said body, a thread cutter carried by said casing beyond the end of said body, and means for locking said body on the pipe, such means comprising a chuck enclosed within the body having gripping jaws, and clamping means within the body for forcing such jaws together into engagement with the pipe, the body having within it parallel guideways, and the gripping jaws having parallel engaging portions adapted to reinforce the chuck members against rotative stress.

14. A pipe-threading tool according to claim 13, the body and casing having holes which coincide in the initial position, and the means for forcing the clutch jaws together having an engaging portion aligned with said coinciding holes to be engaged by a key entered through such holes for operating the chuck.

15. A pipe-threading tool comprising a stationary body, a casing rotative around said body, a planetary thread cutter rotated in bearings carried by said casing, a crank for rotating said cutter, and a catch for holding the casing against rotation in the starting position, the casing and body having screw-threaded engagement whereby the casing travels axially during the planetary movement of the cutter, and said catch comprising a bolt and notch having axial clearance less than the pitch of the thread, so that at the end of the planetary cutting operation they are relatively displaced so as to be unengageable.

In witness whereof, we have hereunto signed our names.

THEODORE M. BRUBACK.
DE LOS E. HIBNER, Jr.